Figure 1:
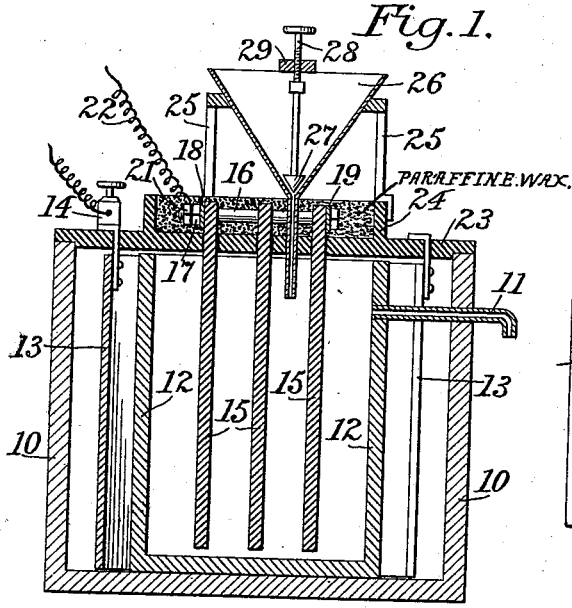

(No Model.)

L. F. JOHNSON.
ELECTRIC BATTERY.

No. 510,604. Patented Dec. 12, 1893.

Attest:
A. N. Jesbera
A. Hidden

Inventor.
Louis F. Johnson
by William B. Greeley
Atty.

THE NATIONAL LITHOGRAPHING COMPANY,
WASHINGTON, D. C.

UNITED STATES PATENT OFFICE.

LOUIS F. JOHNSON, OF POUGHKEEPSIE, NEW YORK.

ELECTRIC BATTERY.

SPECIFICATION forming part of Letters Patent No. 510,604, dated December 12, 1893.

Application filed July 11, 1893. Serial No. 480,115. (No model.)

*To all whom it may concern:*

Be it known that I, LOUIS F. JOHNSON, of Poughkeepsie, in the county of Dutchess and State of New York, have invented certain new and useful Improvements in Electric Batteries; and I do hereby declare that the following is a full and exact description thereof, reference being had to the accompanying drawings, and to the letters of reference marked thereon, making a part of this specification.

My invention relates to galvanic batteries and its object is to provide for prolonging the time during which a current of constant strength may be obtained from a cell. When a constant difference of potential and current is required, it is necessary to employ a depolarizing agent for the purpose of removing the hydrogen or gas of kindred nature, which forms on the positive elements of a cell and reduces its efficiency. The action of the depolarizing agent is in direct proportion to its amount; that is to say, as soon as a portion of it has attained its object and eliminated the gas, it is changed in character by forming a new compound, and is no longer of service, but as the hydrogen is continually formed by the action of the electric current, it is necessary to provide a constantly fresh amount of the depolarizer to take the place of that used up. It has been found that nitric acid forms a depolarizing agent of great power particularly when sulphuric acid is employed as the active chemical agent. Its action does not continue as long as might be desired, however, and in certain cases when the cell must remain on closed circuit, means must be adopted for continuously supplying fresh depolarizer to the cell. And I have herein shown means for continuously introducing the depolarizing agent into the cell in small portions. Furthermore, where such an acid is employed as a depolarizing agent, it is advisable to guard against the corrosive action of the fumes which are evolved. The metals such as are generally used for binding posts are readily affected by such fumes and when carbon is used as an element, the acid creeps up by capillary attraction through the carbon and attacks the connectors thereto attached. To prevent the acid from being drawn up into the part of the carbon standing out of the electrolyte, I treat said parts with paraffine wax, the method of doing so being described in detail in the body of this specification. For the purpose of continuously introducing into the cells the necessary amount of depolarizer, I place a reservoir adapted to contain the depolarizer above the cell. By means of a contracted channel between the reservoir and the porous cup and a plunger fitting into it, the flow of the acid may be nicely adjusted so as to deliver to the cup a fresh amount of the acid in proportion to the current taken out of the cell. To guard against a possible overflow as the acid is gradually fed to the porous cup, I provide said cup with an overflow pipe, which permits the spent liquid to find its way out into a conveniently located receptacle. Finally, I have found that the principal object which I have had in view, namely, the prolongation of the life and strength of the cell, is subserved by following a certain method in charging the cell, which method is also comprised in my invention and will be particularly described hereinafter.

Figure 2:
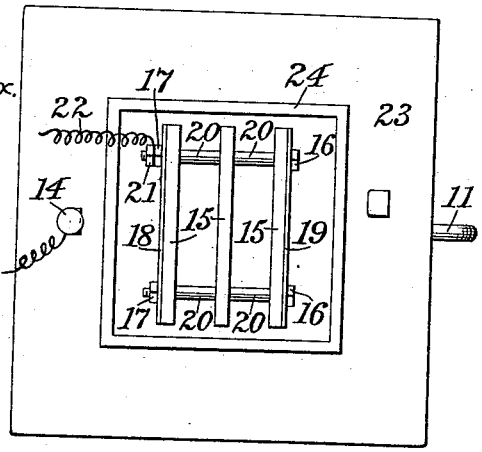
Figure 3:
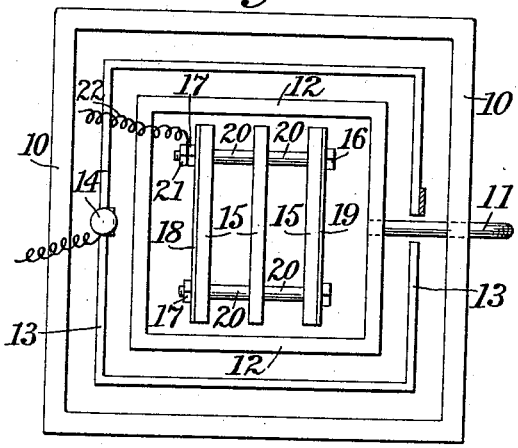
Figure 5:
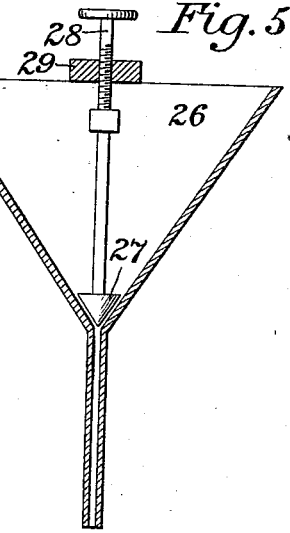
Figure 4:
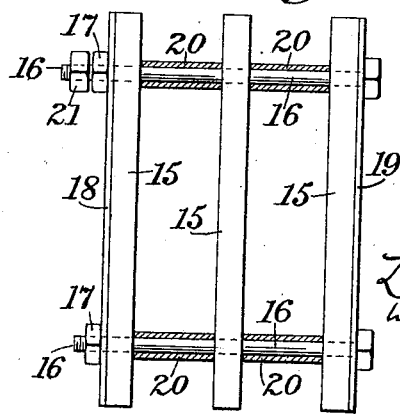

In the accompanying drawings: Figure 1 is a vertical central section of a single cell set up and equipped according to my invention. Fig. 2 is a plan view of the cell with the reservoir removed. Fig. 3 is a plan view of such a cell, having the cover removed but with the elements in place. Fig. 4 is a top edge view of the carbon plates with spacing sleeves in section, showing the method of connecting two or more of them. Fig. 5 is a detail view in central vertical section of a convenient form of reservoir for supplying the depolarizer.

The containing jar 10 may be made of glass, hard rubber, fiber or any other material capable of withstanding the action of diluted acids. In the side of the jar I place an outlet or overflow pipe 11 which communicates with the interior of the porous cup 12 and to which it is hermetically joined near the top. The zinc plate 13 may be made in the usual manner as a continuous plate bent to nearly surround the porous cup. It is provided with a binding post 14 which may be attached to it by means of rivets or be cast with it and afterward drilled and tapped. The positive element is constructed of two or more flat carbon plates 15 joined together at the top or head by means of the bolts or studs 16 which have threaded ends and screw into nuts 17 after passing through the side plate 18 on one side of one carbon plate and the other side plate 19 on the opposite side of another carbon plate. To keep the carbon plates apart I make use of washers or thimbles 20 which are placed on the bolts between the plates, but any other device may be used which will serve the purpose. One of the studs 16 is longer than the other and is provided with a jam-nut 21 for the purpose of attaching the terminal wire 22 to it. The cover 23 is constructed of rubber or other suitable material and has slots as shown in Fig. 1 through which the carbon plates are passed, the side plates 18, 19, or the studs 16, resting upon the top of the cover and supporting the carbon plates. Around the carbon heads is formed a surrounding rim 24 forming a shallow tray of such height as to cover the heads of the carbon plates when they are set in place. Mounted on the cover is a standard 25 adapted to support the depolarizing liquid reservoir 26. For the purpose of graduating the flow of the liquid, I make use of a plunger 27 which is adapted to enter the contracted neck or discharge orifice of the reservoir and is provided with a regulating screw 28 passing through a cross piece 29 which rests on the edge of the reservoir 26. By the adjustment of the plunger with respect to the neck of the reservoir the liquid which is contained in the reservoir is permitted to drip at any desired speed. Before the cell is set up the carbon plates are treated with paraffine wax by being boiled therein until the wax has thoroughly penetrated the carbon. For plates of one-half inch thickness it will be found necessary to allow the boiling wax to remain in contact with the carbon for ten to fifteen minutes. On removing them from the cooling wax it will be found that the degree of porosity of the carbon has been greatly lessened, and that fluids will not be as readily absorbed and consequently will not tend as much to creep up by capillary attraction. The plates may now be placed in position by being slipped through the apertures in the cover 23, as shown in Fig. 1, and the terminal wire 22 attached by means of the jam-nut 21. The surrounding tray 24 may be filled with paraffine wax, whereby the carbons will be provided with a solid covering which will protect the connections indefinitely from the acid.

In charging the cell I fill the containing jar, outside of the porous cup, with pure water to the proper distance below the top, a quantity of mercury being also put in to provide for the proper amalgamation of the zinc. In the porous cup I put sulphuric acid, water and nitric acid in the order named and in about the following proportions, to wit, five parts of sulphuric acid, two parts of water, and five parts of nitric acid. The sulphuric acid and water naturally mix more or less, but I take care that the nitric acid shall lie upon the other liquids and shall not be stirred up but shall remain in the upper portion of the cup so that when the cell is in circuit it will be in the best position for removing the hydrogen which forms on the carbon plate. In the same manner when the nitric acid is supplied from the reservoir located above the cell, it will remain in the upper part of the porous cup. I prefer that the porous cup should be of somewhat denser material than that ordinarily used in cells of this character in order to retard somewhat the mixture of the acids within the cup with the water outside and thereby to prevent the too rapid action of the acid upon the zinc, although of course the water outside of the cup must become somewhat acidulated before the cell attains its full strength.

The operation of the cell requires no further description, being practically similar to others of a kindred sort.

I claim as my invention—

1. In a galvanic battery, the combination of a positive element consisting of two or more carbon plates having their tops or heads rendered impervious to an acid fluid and joined together by means of metallic devices, a shallow tray adapted to embrace the tops of said carbon plates and filled with paraffine, a porous cup, a negative element and a containing jar, substantially as described.

2. In a galvanic battery, the combination of a positive element consisting of two or more carbon plates having their tops or heads rendered impervious to an acid fluid and joined together by means of metallic studs, plates and nuts, a cover formed with sides adapted to surround said carbon tops or heads and filled with paraffine, a porous cup, a negative element, a reservoir adapted to contain a depolarizing fluid located above the cell, and a containing jar, substantially as described.

3. The method of charging a galvanic battery cell, which consists in surrounding the negative element with water, placing the positive element in a porous cup and filling the porous cup with sulphuric acid, water and nitric acid in the order named and in about the proportions specified.

In testimony whereof I have signed my name to this specification in the presence of two subscribing witnesses.

LOUIS F. JOHNSON.

Witnesses:
  A. N. JESBERA,
  A. WIDDER.